July 9, 1957  G. ZEININGER ET AL  2,798,242
SCREEN WIPERS
Filed July 6, 1953
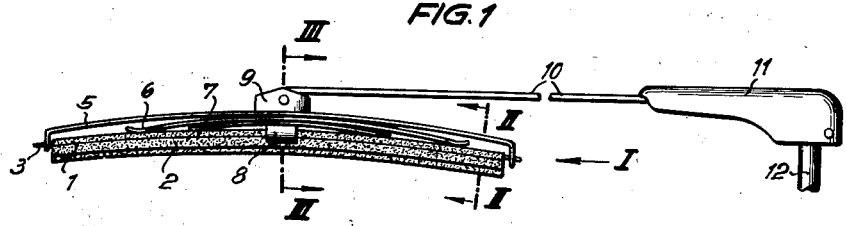
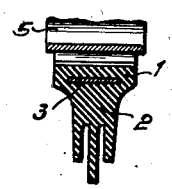
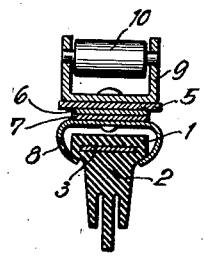
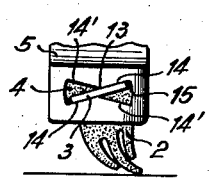
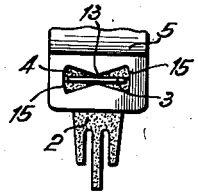
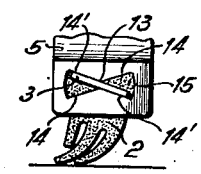
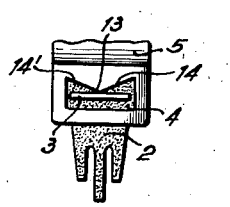
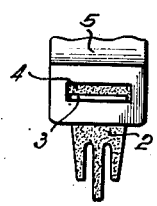
INVENTORS
Gustav Zeininger
Gottlob Bacher

United States Patent Office 2,798,242
Patented July 9, 1957

2,798,242

SCREEN WIPERS

Gustav Zeininger, Oberesslingen, and Gottlob Bacher, Stuttgart-Weil im Dorf, Germany, assignors to Robert Bosch G. m. b. H., Stuttgart, Germany Application July 6, 1953, Serial No. 366,276

Claims priority, application Germany July 10, 1952

3 Claims. (Cl. 15—245)

This invention relates to a screen wiper having a wiper blade widened along that edge remote from its working edge to form an integral longitudinal bridge portion which faces the wiper blade holding stirrup, which bridge portion has a flat strip passing through it to stiffen or reinforce the wiper blade against bending or flexing substantially only in the direction of the wiping movement of the blade, and the ends of said flat strip project from the ends of the bridge portion and are connected with the holding stirrup.

In the known screen wipers of this type the projecting ends of the reinforcing strip are firmly connected to the ends of the holding or supporting stirrup. If, in such a case, the wiper blade when in service is required to reverse from one to the other inclined position in known manner upon any change of wiping direction, additional means must be provided to ensure this displaceability of the wiper blade. Moreover, when the wiper blade becomes worn out through service, the holding stirrup must also be renewed as the holding stirrup and the wiper blade are combined to form a single structural member or unit.

These known screen wipers may be simplified and improved if, in accordance with the present invention, the projecting ends of the reinforcing strip engage in slots in the holding stirrup so as to be freely displaceable therein, said slots being so formed as to enable tilting of the wiper blade relative to the stirrup from one to the other inclined position when the direction of wiping is changed.

With a screen wiper constructed in accordance with the present invention, the necessary displaceability of the wiper blade is ensured without any additional auxiliary means. Also, the wiper blade may be easily removed from the holding stirrup, so that in case of wear only the wiper blade itself need be renewed in a simple manner.

The invention is further described with reference to the accompanying drawings which illustrate three embodiments of the invention by way of examples only and in which:

Fig. 1 is a side elevation of a holding stirrup with wiper blade suspended from a wiper blade actuating arm, Fig. 2 a cross section on line II—II of Fig. 1 but drawn to a larger scale, Fig. 3 a similarly enlarged cross-section on the line III—III of Fig. 1, Fig. 4 an end view drawn to the same scale as Fig. 2 of the holding stirrup with wiper blade as viewed in the direction of the arrow I in Fig. 1, Fig. 5 a view similar to Fig. 4 but showing the wiper blade as when being operated in one direction of movement, Fig. 6 another view similar to Fig. 4 but showing the wiper blade as when being operated in the opposite direction of movement, and Figs. 7 and 8 further views similar to Fig. 4 showing modified examples of construction.

Referring to the drawings, in the longitudinal bridge member 1 of the wiper blade 2, which is substantially of T-shaped cross section, a flat reinforcing strip 3 is embedded, the ends of which strip projecting from both ends of the wiper blade. These projecting ends of the reinforcing strip 3 are engaged in guide slots 4 of the correspondingly bent or angled ends of a holding stirrup 5. Between the holding stirrup 5 and the wiper blade 2 are two leaf springs 6, 7 which are attached to the holding stirrup 5. The free ends of the leaf springs press resiliently against the longitudinal bridge member 1 of the wiper blade. In the middle of the holding stirrup 5 and at one side thereof is mounted a joining and guiding stirrup 8 which embraces the longitudinal bridge member 1 of the wiper blade, whilst on the opposite side of the holding stirrup 5 is secured a bearing block 9 for detachably mounting the wiper actuating arm 10. The other end of the wiper arm 10 is secured to a holder 11 which is detachably connected to the driving shaft 12.

As shown in Figs. 4 to 6, the slots 4 are arranged in the bent ends of the holding stirrup 5 and are in the form of an X, i. e. having a width diminishing from both ends towards the centre, said slots being so dimensioned that the ends of the reinforcing strip 3 are free to tilt or rock over to both sides to a limited extent. With each change of direction of movement of the screen wiper each end of the strip pivots, as shown in Figs. 5 and 6, about the supporting or fulcrum point 13 from one to the other inclined position and is thereby positioned, during the actual wiping operation, against one or other of the bearing edges 14, 14' of the slot 4. Moreover, in order to ensure a noiseless and reliable reversal of the blade, the narrowest width at the centre of each slot 4 is made just slightly wider than the thickness of the engaging end of the strip 3 therein and the widest ends 15 of the slot are arcuate to conform to the tilting radius of the end of the strip 3.

Whilst in the example just described both longitudinal limiting edges of the slots 4 are so formed that each slot is only slightly wider at the centre than the thickness of the end of the strip 3, in the example shown in Fig. 7 only the upper longitudinal edge of the slot is pointed downwardly in the middle, whilst the lower longitudinal edge extends in a straight line with a correspondingly larger clearance between the upper edge.

A further contemplated example of the form which the slots 4 may take is illustrated in Fig. 8. In this case the slot 4 is arranged in the form of a rectangle.

Between the guiding slots 4 the wiper blade 2 is also supported against bending or flexing in the direction of the wiper movement by the U-shaped guiding stirrup 8 which has its shanks embracing the longitudinal bridge portion 1 of the wiper blade 2 like a clamp with a certain amount of play to enable the wiper blade to also tilt therein.

The ends of the reinforcing strip 3 project through the guiding slots 4 of the stirrup 5 just sufficient to enable each of these ends to be drawn out of their guiding slots 4 by bending or flexing the half of the wiper blade concerned. Thereupon, the wiper blade 1 and 2 may be extracted as a whole, on the side on which one end of the strip 3 has been withdrawn from its guiding slot 4, from the other slot 4 at the opposite end of the stirrup 5 and from the embracing channel of the centre guiding stirrup 8, thus enabling the wiper blade to be easily exchanged when required.

We claim:

1. In a screen wiper, the combination of a wiper blade holding stirrup having ends bent at an angle and disposed in spaced confronting relation, an elastic wiper blade widened along that edge remote from its working edge to form an integral longitudinally extending bridge portion and having a flat reinforcing strip passing axially through said bridge portion to stiffen the wiper blade against bending substantially only in the direction of wiping movement of the blade, the ends of said reinforcing strip projecting axially from the ends of the bridge portion and the bent ends of the stirrup each having a transverse slot receiving an end of the reinforcing strip, and said slots being so shaped as to enable tilting of the wiper blade from one to the other inclined position upon change of wiping direction.

2. A screen wiper according to claim 1 in which at least one guiding stirrup is arranged on the holding stirrup between the ends of the wiper blade, said guiding stirrup having inturned arms embracing the bridge portion of the wiper blade in such manner as to support the wiper blade against bending in the direction of wiping movement but at the same time to permit it to tilt from one position to another.

3. In a screen wiper, the combination of a wiper blade widened along that edge remote from its working edge to form an integral longitudinal bridge portion, said bridge portion having a flat reinforcing strip running through it and adapted to stiffen the wiper blade against bending substantially only in the direction of the wiping movement of the blade, the ends of said reinforcing strip axially projecting from the ends of said bridge portion, and a wiper holding stirrup having bent ends disposed in spaced confronting relation and said ends being transversely slotted to receive the projecting ends of said reinforcing strip with clearance between the slots in the holding stirrup and the engaging strip ends, whereby to allow tilting of the wiper blade from one to the other inclined position upon change of wiping direction, and said slots being so shaped as to provide fulcrum points against which the projecting ends of the reinforcing strip are supported constantly along their midwidth, whereby to enable the wiper blade to tilt about said supporting points.

References Cited in the file of this patent
UNITED STATES PATENTS

| | | |
|---|---|---|
| 1,112,793 | Heineman | Oct. 6, 1914 |
| 1,739,896 | Garbell | Dec. 17, 1929 |
| 2,276,556 | Zaiger | Mar. 17, 1942 |
| 2,634,446 | Mackie | Apr. 14, 1953 |
| 2,659,097 | Morton | Nov. 17, 1953 |